United States Patent [19]

Taylor

[11] Patent Number: 5,076,932

[45] Date of Patent: Dec. 31, 1991

[54] REMOVAL OF TRACE CONTAMINATION FROM WATER

[75] Inventor: John A. Taylor, Pinckney, Mich.

[73] Assignee: Separation Dynamics Inc., Southfield, Mich.

[21] Appl. No.: 542,799

[22] Filed: Jun. 22, 1990

Related U.S. Application Data

[63] Continuation of Ser. No. 355,320, May 22, 1989, abandoned.

[51] Int. Cl.⁵ .............................................. B01D 61/36
[52] U.S. Cl. .................................... 210/640; 210/641; 210/500.23
[58] Field of Search .................... 210/641, 640, 500.23

[56] References Cited

U.S. PATENT DOCUMENTS 4,203,847  5/1980  Grandine et al. .................. 210/490
4,311,594  11/1989  Perry ................................ 210/640

Primary Examiner—Frank Spear
Attorney, Agent, or Firm—Reising, Ethington, Barnard, Perry & Milton

[57] ABSTRACT

A process for removing trace amounts of water soluble organic and inorganic substances dissolved in a water supply from the water supply includes the steps of flowing water from the water supply including trace amounts of the water soluble substances dissolved therein adjacent to and in contact with one side of a semipermeable barrier within a chamber, inducing evaporation of the trace amounts of the water soluble substances from the flowing water and permeating the evaporated water into the barrier. The water soluble organic and inorganic substances are removed from the barrier and chamber thereby further inducing evaporation and removal of the water soluble substances from the flowing water. The flowing water free of trace amounts of the water soluble organic and inorganic substances are also removed from the chamber.

5 Claims, 1 Drawing Sheet

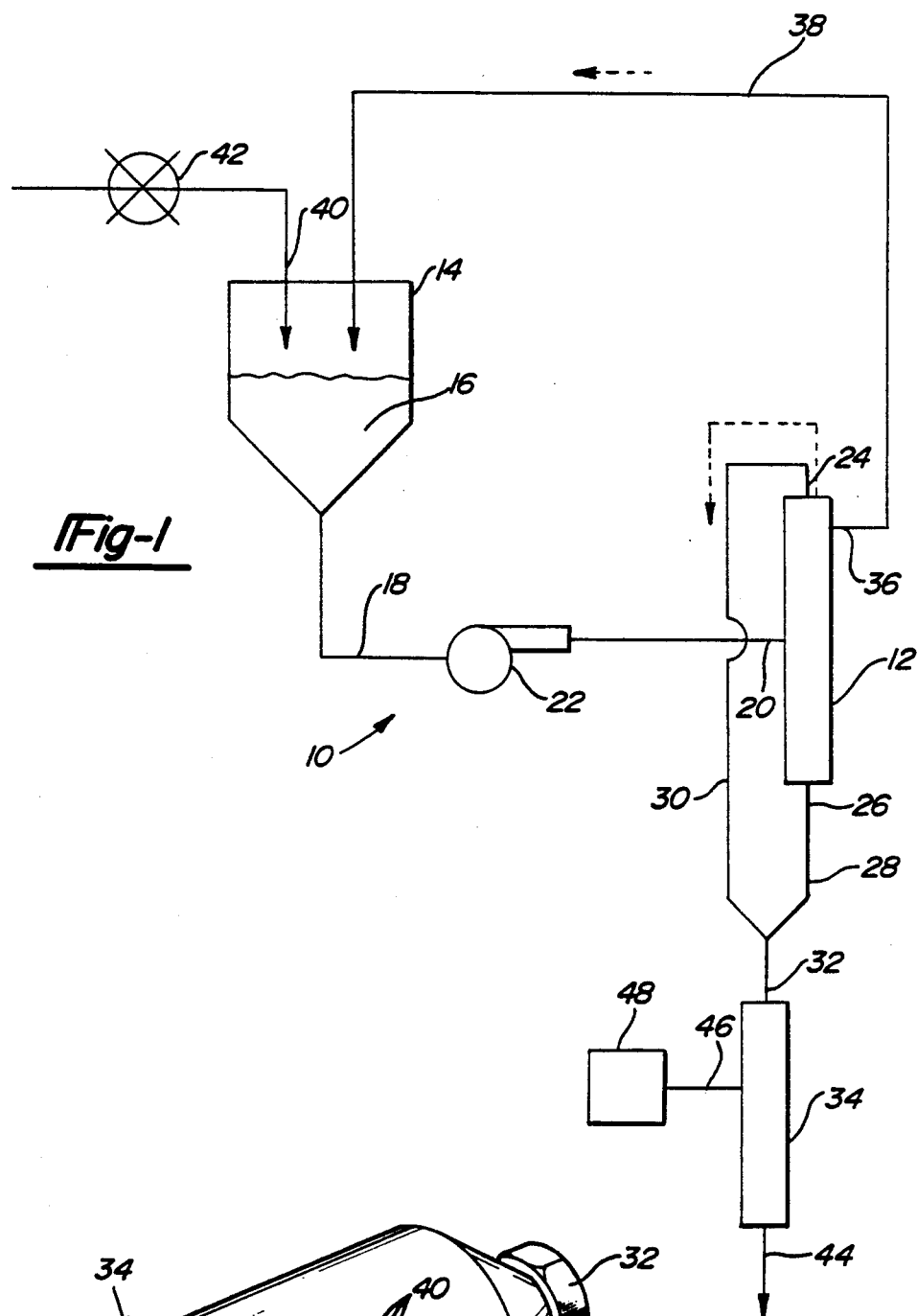
_Fig-1_
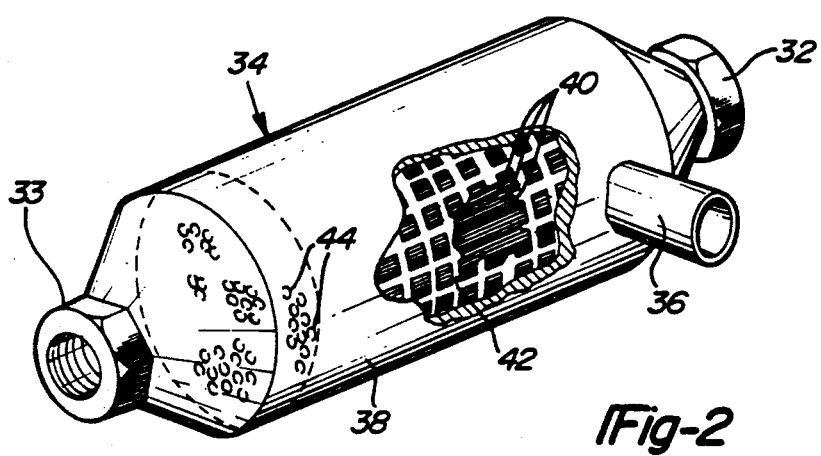
_Fig-2_

REMOVAL OF TRACE CONTAMINATION FROM WATER

This application is a continuation of application Ser. No. 355,320, filed May 22, 1989, now abandoned.

TECHNICAL FIELD

The present invention relates to a process of removing trace contamination from water. More specifically, the invention provides a process utilizing hollow fiber membranes to remove trace amounts of water soluble organic and inorganic substances from a water supply previously treated for the removal of gross contamination.

BACKGROUND ART

The inventor of the present invention has developed a process for separating water from a water and hydrocarbon or a halogenated hydrocarbon mixture, as disclosed in U.S. Pat. No. 4,857,081 to Taylor, issued Aug. 15, 1989. In accordance with the process, water, is efficiently and effectively separated from a mixture of water with hydrocarbons and/or halogenated hydrocarbons. The water separated from the hydrocarbons and/or halogenated hydrocarbons can contain trace levels of organic and inorganic substances soluble in the water which can impart objectionable odor, taste or toxicity to the water. In other situations, ground water may contain such trace contaminates. There are additionally a variety of water purification methods available that are capable of removing organic and inorganic contaminates from water, such as reverse osmosis, ion exchange resins, ultrafiltration membranes, activated carbon, distillation, and others which leave such trace contaminates in the treated water.

It is desirable to utilize applicant's inventive process of separating water from water mixed with hydrocarbons and halogenated hydrocarbons and further to have the specific capability for the removal of such inorganic substances as hydrogen sulfide, hydrogen cyanide, and other substances such methanol, ethanol, and other inorganic and organic compounds that may permeate the nonporous membrane disclosed in applicant's copending application, even in extremely low concentration. In other words, applicant has provided a process for separating a water and water soluble substance permeate from a mixture of water with halogenated hydrocarbon and hydrocarbons. It is now desirable to be able to remove those trace amounts of water soluble organic or inorganic substances from the water permeate.

The U.S. Pat. No. 4,814,087 to applicant and assigned to the assignee of the present invention discloses a fuel delivery system which separates by cross flow separation a substantially water and particle free fuel permeate flow from a fuel retentate flow. The invention specifically uses a tangential flow separator comprising a module containing a plurality of hollow hydrophobic microporous membrane fibers contained as a bundle within a polyurethane tube sheet. The module receives a flow of diesel fuel from a fuel tank, the diesel fuel containing water and water soluble substances therein. The module separates through a cross flow semipermeable membrane a substantially water and particle free fuel permeate from the drawn fuel retentate flow. Thusly, this system provides a means of delivering bone dry fuel to a fuel tank by utilizing a semipermeable membrane. The invention relates to the drying of hydrocarbons but does not relate to the decontamination of water per se.

SUMMARY OF THE INVENTION

In accordance with the present invention, there is provided a process for removing trace amounts of water soluble organic and inorganic substances dissolved in a water supply from the water supply, the process including the steps of flowing water from the water supply including trace amounts of the water soluble substances dissolved therein adjacent to and in contact with one side of a semipermeable barrier within a chamber and inducing evaporation of the trace amounts of the water soluble substances from the flowing water and permeating the evaporated water into the barrier. The water soluble substances are removed from the barrier and chamber thereby further inducing evaporation and removal of the water soluble substances from the flowing water and the flowing water free of trace amounts of the water soluble organic and inorganic substances are removed from the container.

FIGURES IN THE DRAWINGS

Other advantages of the present invention will be readily appreciated as the same becomes better understood by reference to the following detailed description when considered in connection with the accompanying drawings wherein:

FIG. 1 is a schematic representation of a system constructed with the present invention; and FIG. 2 is a side elevational view partially broken away of a filter assembly constructed in accordance with the present invention.

DETAILED DESCRIPTION OF THE DRAWINGS

FIG. 1 illustrates a fluid separation system for use with a process in accordance with the present invention, the system being generally indicated at 10. The system 10 includes a filter module 12 containing a plurality of nonporous self-supported hollow fibers of regenerated cuproammonium cellulose made and constructed in accordance with the modules disclosed in copending U.S. Pat. No. 4,857,081 to applicant, issued Aug. 15, 1989. A storage tank 14 containing a mixture of hydrocarbon (such as oil) contaminated water 16 is in fluid communication with the outer surface of the membranes contained within the filter module 12 through conduit 18. A positive pressure is exerted on the in flowing mixture through an inlet 20 into the filter module 12 by a pump 22. Water diffusing through the plurality of hollow fibers within the filter module 12 are collected by gravity flow and leave the filter module 12 through outlets 24,26 and are conducted through conduits 28 and 30 to an inlet 32 of a second filter module 34.

The module 12 containing fibers made of regenerated cuproammonium cellulose or viscose produce a hydrocarbon free water permeate collected through conduits 28,30. The permeate water is free of hydrocarbons and/or halogenated hydrocarbons. However, the water permeate can contain water soluble organic and/or inorganic substances which are imbibed by and diffused through the regenerated cellulose fibers in solution with the water.

The retentate mixture, which has been concentrated due to the separation of water therefrom, leaves the housing 12 through outlet 36 and is recycled through conduit 38 back to the storage tank 14. Continual recirculation of the mixture concentrates the mixture as it is collected in the tank 14. Periodically, additional mixture can be added to the tank 14 through conduit 40. Valve 42 selectively controls the flow of fluid mixture through the conduit 40 into the tank 14.

As discussed above, this closed loop recycling system separates water from the water and hydrocarbon and/or halogenated hydrocarbon mixture. A concentrated water and hydrocarbon and/or halogenated hydrocarbon mixture retentate exits the module 12 through outlet 36 while the water permeate containing water soluble organic and/or inorganic substances exits the module 12 through outlets 24 and 26 and is carried by conduits 28,30 to inlet 32 of module 34. Thusly, a water supply containing organic and/or inorganic substances dissolved therein is conducted to module 34.

An enlarged detailed perspective view of the module 34 is shown in FIG. 2. Separation module 34 includes the inlet 32, a retentate outlet 33 and a permeate outlet 36. The separator module 34 includes an outer housing 38 containing a plurality of hollow hydrophobic microporous membrane fibers 40 contained as a bundle within a polyurethane tube sheet 42. The fibers 40 are embedded in a potting material 44 adjacent the inlet and outlet 32,33. Each fiber 40 includes a hollow core having an inner surface extending about the hollow core. Each fiber 40 also includes an outer surface. The hollow cores of the fibers 40 define a plurality of first passageways in fluid communication between the inlet 32 and retentate outlet 33 thereby defining a first flow path through the separator module 34. The housing 38 in combination with the outer surfaces of the fibers 40 define a second passageway or chamber in fluid communication with the permeate outlet 36.

The membrane fibers 40 are microporous membranes separating the first and second passageways. The membrane fibers 40 extend parallel to the flow path of fluid flowing through the first passageway defined by the inner cores of the fibers 40 and the flow tangentially contacts the length of the flow path. Alternatively, the flow path could contact the outer surface of the fibers 40, the permeate flowing through the fibers and exiting the module 34 through the permeate outlet 33.

The fibers 40 can comprise a homogenous layer of microporous material made from hydrophobic materials such as polypropylene and tetrafluorocarbon resins. The resins included in this group must be extremely resistant to degradation in the environment of the hydrophilic elements such as water and dissolved water soluble components. Examples of such materials are polyethylene, polypropylene, polyvinylidene fluoride, polytetrafluoro ethylene, polysulfone, nylon or any other hydrophobic membrane material consistent with the properties of the aforementioned materials. These materials allow the permeation of such materials as phenol, propane and hydrogen sulfide while providing a hydrophobic barrier to the permeation of liquid water. Such fibers are capable of removing trace amounts of the substances dissolved in the water while effecting an absolute barrier to water permeation.

The barrier promotes evaporation of the soluble materials from the water and then absorbs the materials therein so as to effectively remove the trace contaminates from the water. In other words, the membrane material in combination with the adjacent flowing water containing the dissolved impurities therein induces evaporation of the impurities. The impurities permeate the porous membranes, the membranes having the capacity to substantially completely remove the trace amounts of the impurities from the adjacent flowing water.

For example, a 10 inch module can contain 197 hollow fibers having an inner diameter of 0.6 millimeters and an average pore size of 0.20 microns. A 20 inch module can contain 440 hollow fibers having an inner diameter of 0.6 millimeters and an average pore size of 0.20 microns. All values are $+/-10\%$.

Referring again to FIG. 1, conduits 28,30 are in fluid communication with inlet 32 of the separator module 34. Flow of water permeate from module 12 enters module 34 through inlet 32 and flows through the core of the hollow fibers contained therein. In accordance with the present invention, the fibers 40 induce evaporation of the trace amounts of the water soluble organic and inorganic substances from the flowing water. The pure water retentate resulting therefrom leaves the module 34 through outlet 33 and conduit 44. The permeate of the water soluble organic and inorganic substances is removed from the module through outlet 46 and is trapped within the container illustrated schematically at 48.

Utilizing the aforementioned apparatus 10, the present invention provides the novel process of removing the trace amounts of the water soluble organic and inorganic substances from the water permeate derived through the use of module 12. The process generally includes the steps of flowing water from the water supply contained within conduits 28,30 adjacent to and in contact with one side of a semipermeable barrier defined by the hollow fiber membranes 40 contained within the separation module 34. The separation module 34 defines a chamber containing the hollow fibers 40. Evaporation of the trace amounts of the water soluble organic and inorganic substances are induced from the flowing water into the porous membranes 40. The water soluble organic and inorganic substances are removed from the membranes 40 and eventually from the separation module 34 through outlet 46 and the flowing water free of trace amounts of the water soluble organic and inorganic substances removed from the module 34 through outlet 33.

More specifically, the water containing the trace amounts of organic and inorganic substances flows through the cores of the hollow fiber membranes 40. The hydrophobic microporous membranes 40 dynamically induce evaporation of the organic and inorganic substances from the water in an unexpectedly efficient manner. The evaporated substances are immediately removed from the core of the fibers 40 by the membranes 40 per se. The substances are transported through the pores of the fibers and removed therefrom by a sweepstream over the opposite side of the fiber. Alternatively, the substances can be removed by other means known in the art. The process totally removes the trace amounts of the water soluble organic and inorganic substances in a single pass.

Unexpectedly, a stream of water containing even as extremely low concentration of a substance such as hydrogen sulfide, which can be easily detected by smell even when present in parts per trillion amounts, is rendered odor free after the water is passed over the aforementioned hydrophobic microporous membranes. Further, as the water passes over the membranes and as the hydrogen sulfide permeates the membrane, a distinct odor of hydrogen sulfide is readily detectable by smell emanating from the opposite side of the membrane. Thus, water, either after having been processed by the method described in the patent U.S. Pat. No. 4,857,081 or by other means, may be rendered to even higher levels of purity by removal of persistent trace impurities in accordance with the present invention. Additionally, untreated ground water can be treated by the present process to remove trace impurities dissolved therein.

Of course, the permeation can occur from the inner core of the fibers through the fibers to the outer core or visa versa depending upon the type of module used. In other words, the permeate side of the membrane can either be within the inner core of the membrane or the outer surface of the membrane depending upon the flow circuit used. In other words, the membrane is a hollow fiber membrane having an inner surface defining an inner passageway and an outer surface contained within the chamber defining an outer passageway therebetween. The water containing the organic or inorganic water soluble substances flows tangentially relative through one of the surfaces through one of the passageways and the water soluble organic or inorganic substance are removed from the other of the surfaces through the other of the passageways. A sweep stream may be provided to increase the efficiency of the removal of the permeating impurities from the module.

EXAMPLES

EXAMPLE I

Water containing 1.65% of a mixture of hydrocarbons as well as 41 ppm hydrogen sulfide and 122 ppm phenol was first treated to remove the hydrocarbon contamination using the process described in U.S. Pat. No. 4,857,081. The purified water produced by the above mentioned process contained 91 parts per billion phenol and 11 ppm of hydrogen sulfide, while hydrocarbons were found to be below 1 part per billion. This water which possessed the characteristic odor of hydrogen sulfide was allowed to flow through the bores of a hydrophobic polypropylene membrane separation module (FIG. 1) with surface area of 2.0 sq. meters at a flow rate of 2 gallons per minute. No liquid water escaped from the one side of the membrane to the other, while hydrogen sulfide could be readily detected by its smell as it permeated through the membrane.

Chemical analysis was performed upon water samples collected from the outlet of the membrane separation module.

Results:

TABLE I

CONCENTRATION OF HYDROGEN SULFIDE AND PHENOL IN WATER BEFORE AND AFTER POLY-PROPYLENE MEMBRANE SEPATION MODULE

| | Before Separation | Before Separation |
|---|---|---|
| Hydrogen Sulfide | 41 ppm | not detectable |
| Phenol | 122 ppm | 1 ppb |

EXAMPLE II

Water obtained from the process described in U.S. Ser. No. 194,984 was pumped through a hydrophobic membrane separation module containing 1.0 sq. meter of polyvinylidene fluoride (PVDF) hollow fibers. The concentrations of hydrogen sulfide and phenol were the same as in Example I. Chemical analysis was performed upon water samples taken from the outlet of the PVDF membrane separation.

Results:

TABLE II

CONCENTRATIONS OF HYDROGEN SULFIDE AND PHENOL IN WATER BEFORE AND AFTER EXPOSURE TO POLYVINYLIDENE FLUORIDE SEPARATION MODULE

| | Before Separation | Before Separation |
|---|---|---|
| Hydrogen Sulfide | 41 ppm | not detected* |
| Phenol | 122 ppm | not detected* |

*detection limit = 1 ppb.

EXAMPLE III

Water containing 96 parts per billion of methanol and 6 parts per billion of propane was pumped at the rate of 2 gallons per minute through the bores of a polysulfone hollow fiber separation module containing 0.86 sq. meters of surface area. No water leaked across the membrane. Chemical analysis was conducted upon the water taken from the outlet of the polysulfone hollow fiber membrane separator.

Results:

TABLE III

CONCENTRATION OF METHANOL AND PROPANE IN WATER BEFORE AND AFTER EXPOSURE TO POLY-SULFONE MEMBRANE SEPARATION MODULE

| | Before Separation | After Separation |
|---|---|---|
| Methanol | 96 ppb | not detected* |
| Propane | 6 ppb | not detected* |

*detection limit = 1 ppb.

It is clear from the results obtained by the above tests that hydrophobic membranes can be used to separate volatilizable substances from water. It is also true that no liquid water was allowed to cross the hydrophobic membrane while the volatile substances can escape through the membrane.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A process for removing trace amount of water soluble organic and inorganic substances dissolved in a water supply from the water supply, said process including the steps of: flowing water from the water supply including the trace amounts of the water soluble substances dissolved therein adjacent to and in contact with one side of semipermeable barrier having pores extending therethrough within a chamber; removing the dissolved water soluble substances by dynamically inducing evaporation of the trace amounts of the water soluble substances by the barrier per se from the flowing water into the barrier; removing the water soluble substances from the barrier and chamber further inducing evaporation and removal of the water soluble substances from the flowing water; and remc ing the flowing water free of trace amounts of the water soluble substances from the chamber.

2. A process as set forth in claim 1 wherein said inducing step is further defined as contacting the flowing water with a hydrophobic semipermeable membrane and selectively permeating pores of the membrane with vapor of the trace amounts of the water soluble organic and inorganic substances.

3. A process as set forth in claim 2 wherein the membrane is made from materials selected from the group including polyethylene, polypropylene, polyvinylidene fluoride, polytetramethylene fluoride, polysulfone, and nylon.

4. A process as set forth in claim 2 wherein the membrane is a hollow fiber membrane having an inner surface defining an inner passageway and an outer surface contained within the chamber defining an outer passageway therebetween, said flowing step being further defined as flowing the water tangentially relative to one of the surfaces through one of said passageways and the water soluble organic and inorganic substances being removed from the other of the surfaces through the other of the passageways.

5. A process as set forth in claim 1 further including the step of separating a water permeate including the water soluble substances dissolved therein from a mixture of water and organic and inorganic substances thereby forming said water supply prior to said flowing step.

* * * * *